United States Patent [19]

Scutt et al.

[11] Patent Number: 5,207,742
[45] Date of Patent: May 4, 1993

[54] CONTROL APPARATUS FOR COAL/MINERAL JIGS

[75] Inventors: G. Edward Scutt, Allegheny County; John J. Glista, Butler County, both of Pa.

[73] Assignee: Svedala Industries, Inc., Pittsburgh, Pa.

[21] Appl. No.: 848,127

[22] Filed: Mar. 9, 1992

[51] Int. Cl.$^5$ .............................................. B03B 5/52
[52] U.S. Cl. .................................... 209/455; 209/491
[58] Field of Search ............... 209/455, 491, 489, 496, 209/456, 457

[56] References Cited

U.S. PATENT DOCUMENTS

| | | |
|---|---|---|
| 2,846,071 | 4/1956 | Richard . |
| 2,854,139 | 11/1955 | Kazmier et al. . |
| 2,883,053 | 12/1955 | Smith . |
| 3,082,873 | 3/1963 | Bartelt . |
| 3,981,718 | 9/1976 | Jedo . |
| 4,248,702 | 2/1981 | Wallace et al. . |
| 4,265,744 | 5/1981 | Weiffen . |
| 4,282,088 | 8/1981 | Ennis . |
| 4,533,464 | 8/1985 | Smith et al. . |
| 4,563,271 | 1/1986 | Schroder et al. . |
| 4,690,753 | 9/1987 | Lotz et al. . |
| 4,953,709 | 9/1990 | Kaufmann . |
| 5,028,317 | 7/1991 | Lyman .................... 209/457 |

OTHER PUBLICATIONS

"Nucleonic Gauges Improve Jig Control" article under Developments to Watch in Feb. 1992 issue of Coal Magazine.

Primary Examiner—H. Grant Skaggs
Attorney, Agent, or Firm—Webb, Burden, Ziesenheim & Webb

[57] ABSTRACT

A nuclear jig control unit which is an electronically controlled system employing nuclear sensing devices and electro-hydraulic operators to proportionally control the opening and closing of a refuse gate of a jig. These components permit remote operator control and monitoring of the jig. The system provides for immediate adjustment of the specific gravity setting which triggers refuse discharge. This allows complete removal of the built-up refuse yet minimizes inadvertent coal losses with the refuse.

9 Claims, 11 Drawing Sheets

CONTROL APPARATUS FOR COAL/MINERAL JIGS

BACKGROUND OF THE INVENTION

1. Field of the Invention

The present invention relates to a coal or mineral washing jig for separating the useful coal or mineral product from refuse, such as rock. More specifically, the invention relates to a nuclear density based jig control system for use in such washing jigs.

2. Background of the Invention

Coal washing jigs have long been utilized to separate useful coal from rock and other refuse in mined material. Jigging is a process which hydraulically separates and stratifies particles to be cleaned according to their density. The process is created through a complex pulsating water cycle that lifts a bed of material to be cleaned so that the particles settle according to their specific gravity; while at the same time moving the material laterally or longitudinally to a weir so that the top stratum is useful coal and can be moved along for further cleaning. In this manner, the coal is separated from the bottom refuse layer of rock which is removed from the cycle.

The basic construction in a well-known "Baum"-type jig comprises a series of components arranged end to end which provide multiple washing compartments allowing for primary and secondary separations. Jigs are generally constructed of two or more compartments wherein each compartment is fitted with a perforated screen plate and a hydraulically operated refuse ejector. The compartments are subdivided into cells which are placed end to end such that the washed product from one feeds the next.

The material from the mine to be cleaned containing useful coal and refuse enters the jig and establishes a bed upon the perforated screen plate. This bed comprising solids and water is alternately pulsed up and down by the jigging action affecting the separation of heavier refuse and lighter coal. The bed is simultaneously moved longitudinally in the jig concurrently with the pulsing action.

The successful operation of a coal washing jig is directly related to the refuse removal control system. A bed depth sensing mechanism is utilized in the Baum-type jig to determine when the amount of rock and heavy contaminants in the jig have reached a point at which they must be discharged to prevent contamination of the washed coal product. This device, called a "float mechanism", comprises a triangular aluminum float which rides in the jig bed at a density level that is adjustable via the specific gravity control weight in the float arm.

The refuse removal system consists of an air cylinder, refuse gate and linkage connecting the two. Its function is to control the removal of the refuse from the bottom of the jig bed. Enough of the bottom strata of the jig bed must be withdrawn to prevent contaminants from entering the upper coal layer yet excessive removal must be controlled since valuable coal should not be withdrawn through the gate. When the refuse gate is closed, rock and heavy impurities are prevented from exiting the jig bed. Coal product, however, continuously overflows the weir above the refuse gate and passes out of the jig. As a new feed enters the jig, the rock and impurities build up, causing the aluminum float to gradually rise. As the float rises, the rocker valve on which it pivots will tilt until air is channeled to the air cylinder. The cylinder will rise and, through the connecting linkage, cause the refuse gate to be opened. The bottom layer of refuse will then pass through the gate and the float will lower, causing the rocker valve to tilt back. The air supply to the cylinder will be cut off and, as the float continues to drop, the valve will exhaust the air in the cylinder to the atmosphere, causing the refuse gate to lower, thus halting the removal of the refuse. The refuse now begins to accumulate again and the cycle repeats itself.

There are many disadvantages of the float actuated gate system. The float is slow to respond to changes in the bed density, and requires visual observation by an operator to verify correct operation. The system is susceptible to malfunctioning due to undetected float wear such that the float position no longer accurately reflects the actual position of the top layer of the refuse layer. The float system exhibits a frequent jamming of the float within the bed. Furthermore, pivot bearing wear of the float mechanism affects the performance of the device, as do changes in the pulsation intensity of the jigging apparatus.

U.S. Pat. No. 3,082,873 to Bartelt discloses a replacement for float actuated systems wherein the measurement of the bed density in a jig is determined through electromagnetic radiation. Bartelt utilizes radiation sources 7 which are mounted outside the bed 2 on the side of the jig. One or two detectors 5 and 5' are adjustably mounted on a cross bear 6 and are located within the bed 2. The detectors 5 and 5' are elongated in the direction of the horizontal flow of the bed. The point source 7 and the elongated detector 5 define a horizontal zone of measurement in which the density of the bed of material is determined. The zone of measurement is triangular in plan and of small vertical thickness. The apparatus for classifying particulate material disclosed in Bartelt utilizes the detectors to detect the radiation from the source which passes through the material lying within the zone of measurement. The amount of radiation detected by the detector will vary inversely with the specific density of material within the zone of measurement. A device uses this determination of the specific gravity of material within the zone of measurement to operate the refuse gate. Bartelt also discloses the use of two radiation detectors positioned offset one from the other. In this case, the electrical signals from both the radiation detectors are led to the rapid acting control device for the refuse gate. The control signal is derived from the difference between the measurements given by the two radiation detectors.

The system disclosed in Bartelt suffers from several disadvantages. In Bartelt's preferred arrangement the radiation sources 7 are placed outside of the bed. This results in greater exposure of radiation to the surrounding area including workers in the immediate area. Additionally, Bartelt fails to disclose any shielding mechanism to minimize and contain the radiation sources when not in use. Bartelt discloses that the sources may be provided within the bed; however, the placement of the detectors 5 in the middle of the bed as taught by Bartelt requires that the sources 7, even if within the bed, be positioned near the edges of the jig bed and still results in exposure of the surrounding environment to radiation.

The desired zone of measurement disclosed in Bartelt is specifically set up to be of minimal vertical thickness.

This minimal thickness of the measurement zone results in a detection of the specific gravity of only a small band of the bed of material Testing of such a minimal slice increases the potential for misrepresentation of the overall specific density of the entire lower layer due to fluctuations in the bed such as due to large chunks of refuse material or the like.

Bartelt also discloses the use of preferably a point like source of radiation or one which extends in the horizontal direction of the bed. Thus, Bartelt is unable to measure bed density over a vertical height.

Bartelt also only provides a single location for the positioning of detectors basing the reliability of the results on the accuracies of individual detectors.

SUMMARY OF THE INVENTION

It is the object of the present invention to solve the problems of the prior art. The present invention provides a source of radiation which is positioned in the middle of the bed to minimize the radiation to which the environment and the workers in the immediate vicinity are exposed during the operation of the device. Shielding is also provided to minimize and contain the radiation when the device is not in operation and to provide greater protection during the installation and repair of the control device.

At least two detectors in the form of scintillation counters are positioned on opposite sides of the source and vertically aligned within the jig bed. The density detectors are arranged to provide a zone of measurement extending about 3" in the vertical direction of the bed. The zone of detection extends from the source or across the direction of travel of the bed towards both detectors. The zone of measurement also extends in the vertical direction of the bed of material to be measured. The zone of measurement can more accurately determine the specific density of material flowing along the bed than heretofore possible in the prior art and to permit proportional opening of the refuse gate to accommodate variations in the bed density within the vertical measurement zone.

A dual channel current loop controller is coupled to both detectors to average the output between the two detectors into a single control signal. The control signal proportionally controls a fast acting hydraulic actuator which operates to open and close the refuse gate.

The system of the present invention thus more quickly and efficiently operates to proportionally control the position of the refuse gate to provide increased recovery of usable coal which heretofore has been discarded with the waste product.

The present system is specifically designed to allow for easy retrofit of existing float valve systems. The installation of the present nuclear based system is relatively simple. The existing float mechanism is removed along with the air cylinder. A prefabricated steel framework comprising the source and detector tubes is lowered into the jig washing compartment immediately in front of the refuse gate to be controlled. The hydraulic cylinder is mounted directly above the refuse gate and connected to the existing gate linkage. The prewired master control panel containing all controllers is installed in a control room. All the interconnecting power supply control wiring is laid in position. Installation of the control panel and electrical connections proceed prior to the installation of the source/detector and actuator assemblies. The nuclear sources are the last items to be installed.

System operations begins with the plant operator setting the high and low specific gravity points to the controller. The set points determine when the refuse gate is raised and lowered. The nuclear source emits a beam of radiation that is monitored along a vertically extending zone of measurement by the scintillation counter detectors. Each detector sends a signal proportional to the radiation detected This signal is dependent upon the specific gravity of the intervening jig bed traversed by the radiation in the zone of measurement. When the signal reaches the high specific gravity set point, the hydraulic cylinder is actuated, raising the refuse gate and permitting removal of the refuse. As the refuse is removed, the specific gravity at the monitored point will gradually drop until the low specific gravity set point is reached. The hydraulic cylinder now reverses direction, thus closing the refuse gate. It is additionally possible with the present system to operate the refuse gate proportionally to the specific gravity detected by the scintillation detection units. In this operation, the gate will be positioned at a normal operating location removing a constant amount of material and as the detected amount of specific gravity of the material increases indicating an increasing amount of refuse material in the bed, the opening of the gate may be proportionally increased in relation to the increase in the specific gravity detected. Similarly, if the specific gravity decreases the opening of the gate may be proportionally decreased to compensate for such detection and to thereby minimize the loss of useful coal.

The present system has the advantage of being easily modified. The high and low set points may be quickly and easily changed at the control panel, making the system highly flexible and easily adaptable to changes in the feed stock.

Other objectives and advantages of the present invention will become apparent with the description of the preferred embodiments explained with reference to the attached drawings.

DESCRIPTION OF THE PREFERRED EMBODIMENT

Figure 1:
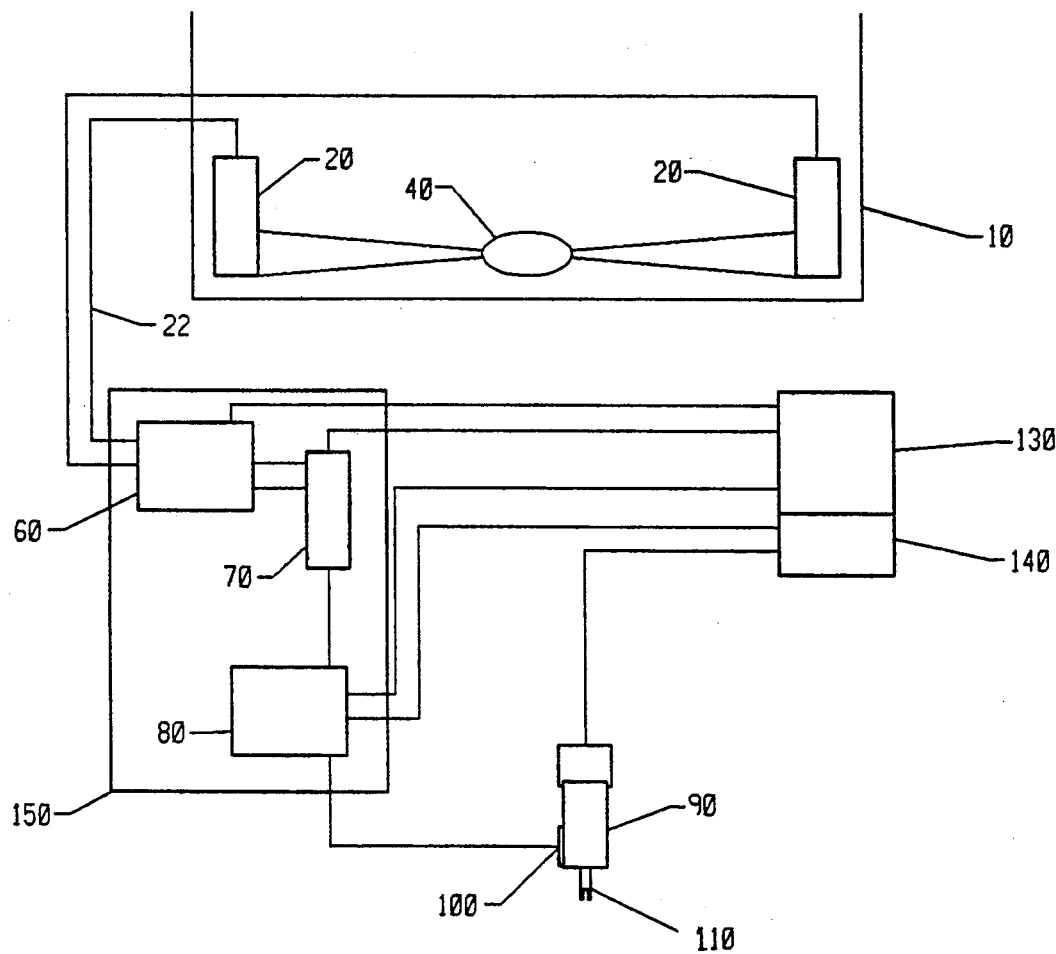
FIG. 1 is a schematic representation of the nuclear jig control unit of the present invention.

FIG. 1 schematically illustrates the refuse gate control unit of the present invention. A part of the control unit is positioned in a jig 10 within the bed of material. A nuclear source 40 such as, for example, cobalt 60 is positioned in the middle of the bed within an insertion type source shielding 44 and an insertion tube 50. The source shielding 44 is a radiation shielding device used to store the nuclear source 40 when the system is not in use. The source shielding 44 is preferably a lead-filled gray cast iron housing. The front section is bolted to insertion tube 50, with the rear section containing a locking mechanism that, when nuclear source 40 has been pulled up from insertion tube 50 and secured within a storage cavity, permits an arm to turn and lock nuclear source 40 within source shielding 44. To activate the system, the lock is opened permitting nuclear source 40 to be lowered into insertion tube 50 permitting operation of the system. During normal operations, source shielding 44 would be in the unlocked position and nuclear source 40 lowered in insertion tube 50; any time that the plant is shut down or maintenance is being performed within the jig 10, the nuclear source 40 must be locked within source shielding 44 for safety purposes.

At least two opposed scintillation type density detectors 20 are positioned on opposite sides of the nuclear source 40. The detectors 20 are positioned in waterproof, stainless steel tubes 30 within termination boxes. The detectors 20 are connected to a microprocessor amplifier 60 through conductor shielded cables 22 (0-15 vdc). The amount of radiation detected by the detectors 20 is transformed into a digital electrical pulse and is conducted to the microprocessor amplifier 60 through the conductor cables 22. The amplifier sends a proportional processed signal to loop controller 70. The signals from the microprocessor amplifier are preferably analoged output signals between 4.0 and 20 mA. The signals from the microprocessor amplifier 60 are averaged by the loop controller 70 into a single analog output, preferably between 4.0 and 20 mA, which is sent to proportional controller 80. The proportional controller 80 sends a control signal, preferably between 0 and 10 volts, to the actuator controller 100 of the actuator unit 90 in proportion to the input received from the loop controller 70. The actuator controller 100 controls the operation of the actuator unit 90 which is an electro-hydraulic linear actuator serving to open and close the refuse gate. The actuator controller 100 may be, for example, a rotary potentiometer which returns a signal to the proportional controller 80 indicating the position of the actuator drive arm 110 to provide accurate control of the refuse gate opening. The actuator unit 90 is coupled to actuator drive arm 110 which operates a refuse gate 120 located in the lower bed layer of the jig 10. The microprocessor amplifier 60, loop controller 70, and proportional controller 80 are located within control panel 150 and powered from power source 130 which is preferably 120 volt AC power source. The actuator unit 90 is powered by reversing starter 140 which may be a 480 volt AC reversing starter. These components permit complete operator control and monitoring of the jig from a remote control room location, which provides improved process control.

Figure 2:
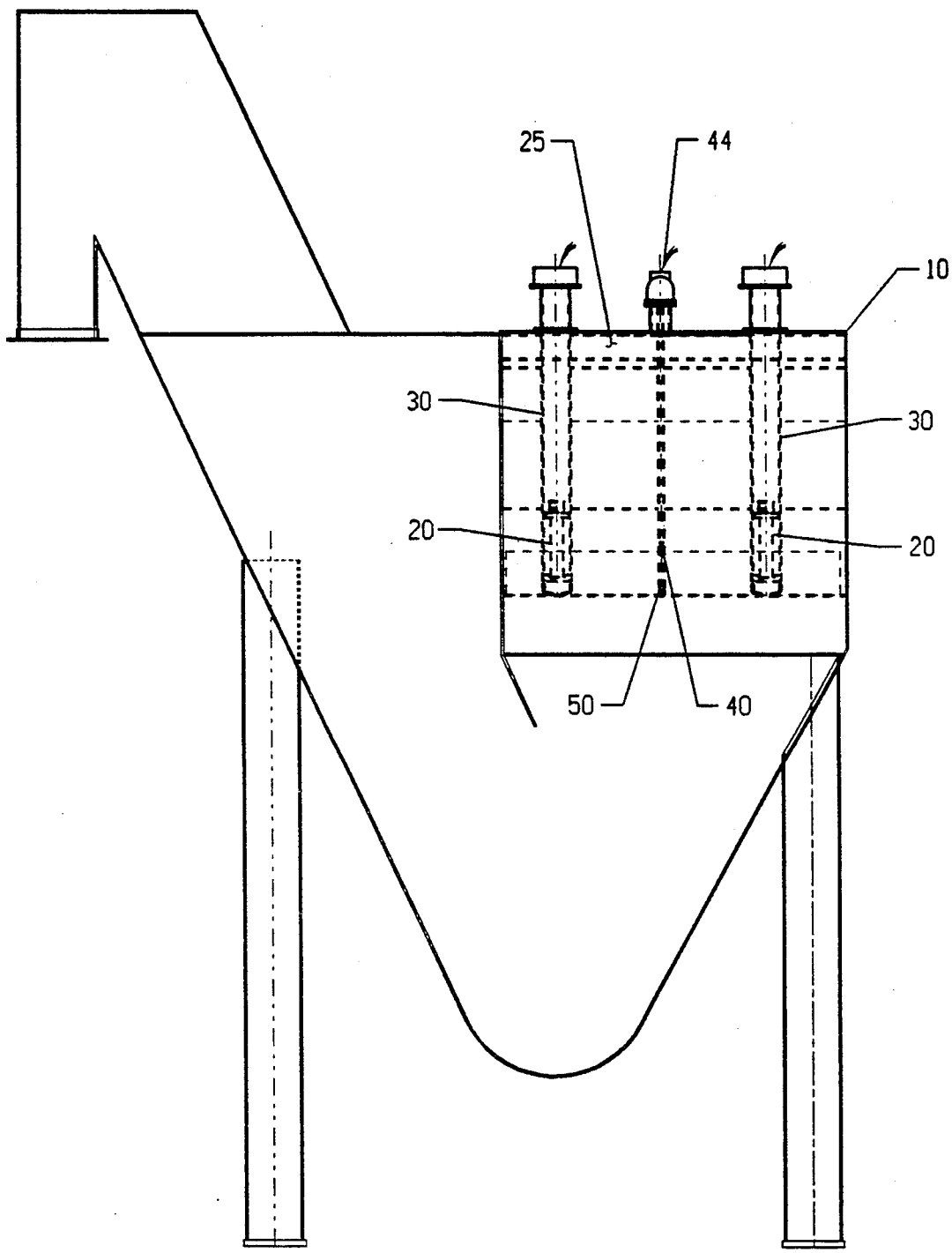
FIG. 2 illustrates a cross-sectional view of the source and detectors within the jig bed.

As can be seen in FIG. 2, the shielding 44 and insertion tube 50 are attached to a cross bracket forming the mounting structure 25. Scintillator detector housing 30 which contains the scintillation detectors 20 are also attached to the mounting structure 25. The attachment of the detector housing insertion tube and nuclear source shielding to the mounting structure 25 allow for easy positioning within the bed of the jig 10. The mounting structure 25 may easily be provided with means to allow for horizontal and vertical movement of the detectors 20 and source 40. This would allow for the desired placement of the detectors 20 and source 40 relative to the location of the refuse layer within the bed. The horizontal movement allows for the placement of the control at the location within the bed where the stratified layers have completely separated.

Figure 3:
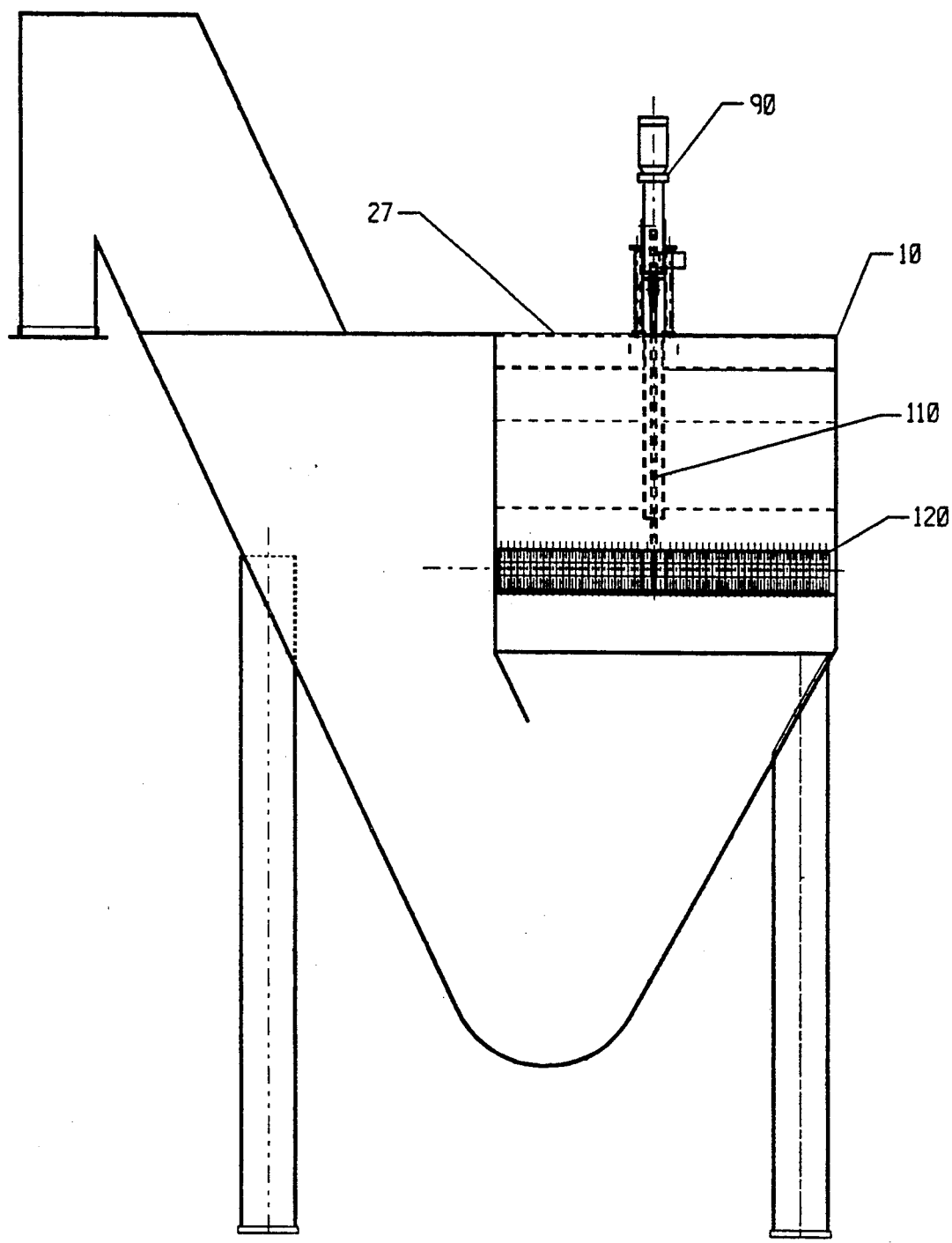
FIG. 3 illustrates a cross-sectional view of the refuse gate actuator of the control unit of FIG. 2.

As can be seen in FIG. 3, the actuator unit 90 and the actuator drive arm 110 are also coupled to a cross beam forming mounting structure 27 for easy placement within the jig 10. FIG. 3 also illustrates the construction of the refuse gate 120. It should be noted that the refuse gate 120 is conventional and preferably comprised of a plurality of individual fingers such that the closing of the gate will not be impeded by a single piece of refuse since the individually movable fingers will allow for the gate to conform to any intervening refuse upon closing.

Figure 4:
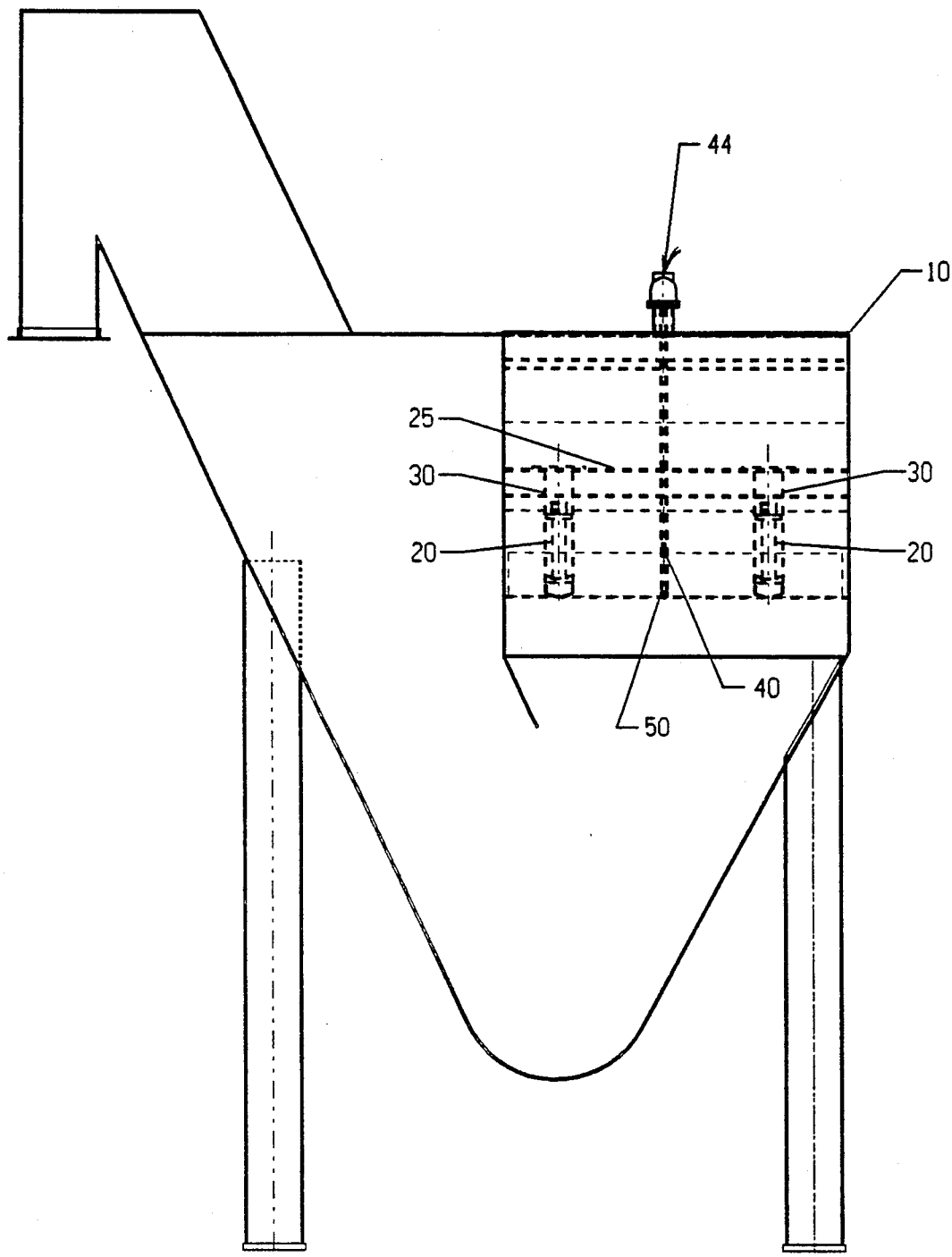
FIG. 4 illustrates a modified positioning for the detectors and source of the present control system.

FIG. 4 represents an alternative embodiment for the control unit of the present invention wherein the cross beam of mounting structure 25 is positioned within the bed of the jig 10 such that the detector housing 30 of the detectors 20 is minimal thereby minimizing the obstruction of the flow of the bed material through the jig 10.

Figure 5:
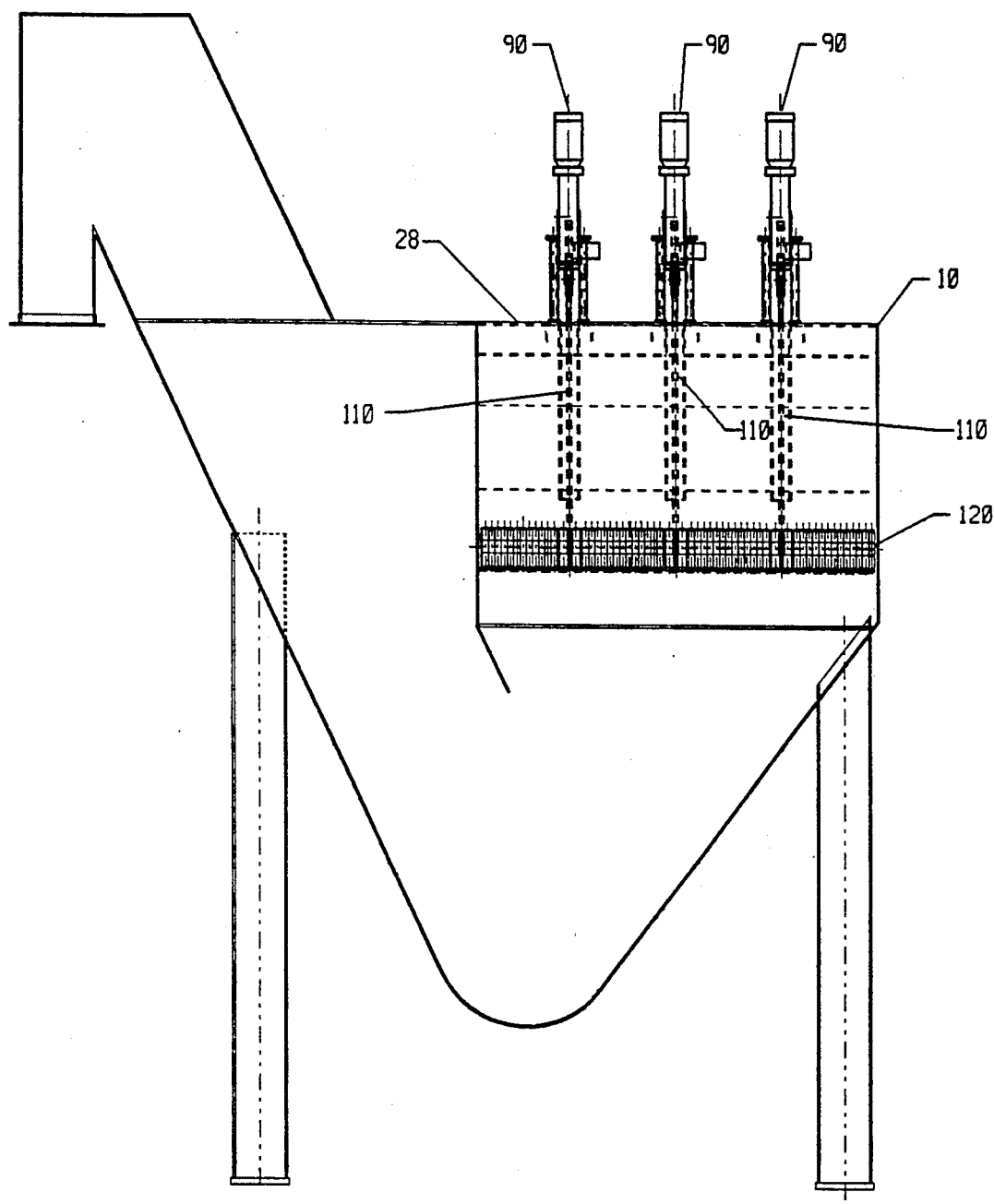
FIG. 5 illustrates a modified refuse gate actuation unit of the present invention.

FIG. 5 illustrates a modified version of the gate controller actuator unit 90 wherein a plurality of independent actuator units are utilized to drive various sections of the refuse gate 120. The provision of a plurality of actuating units allows for independent control of specific sections of the refuse gate 120 as well as increasing the response time of the opening and closing of the refuse gate 120. The independent operation would be particularly useful to respond to variations across the stratified bed. For example, the independent operation would allow for the removal of one large, anomolous piece of refuse without increasing the opening of the entire gate which could result in the loss of some desired product.

Figure 6:
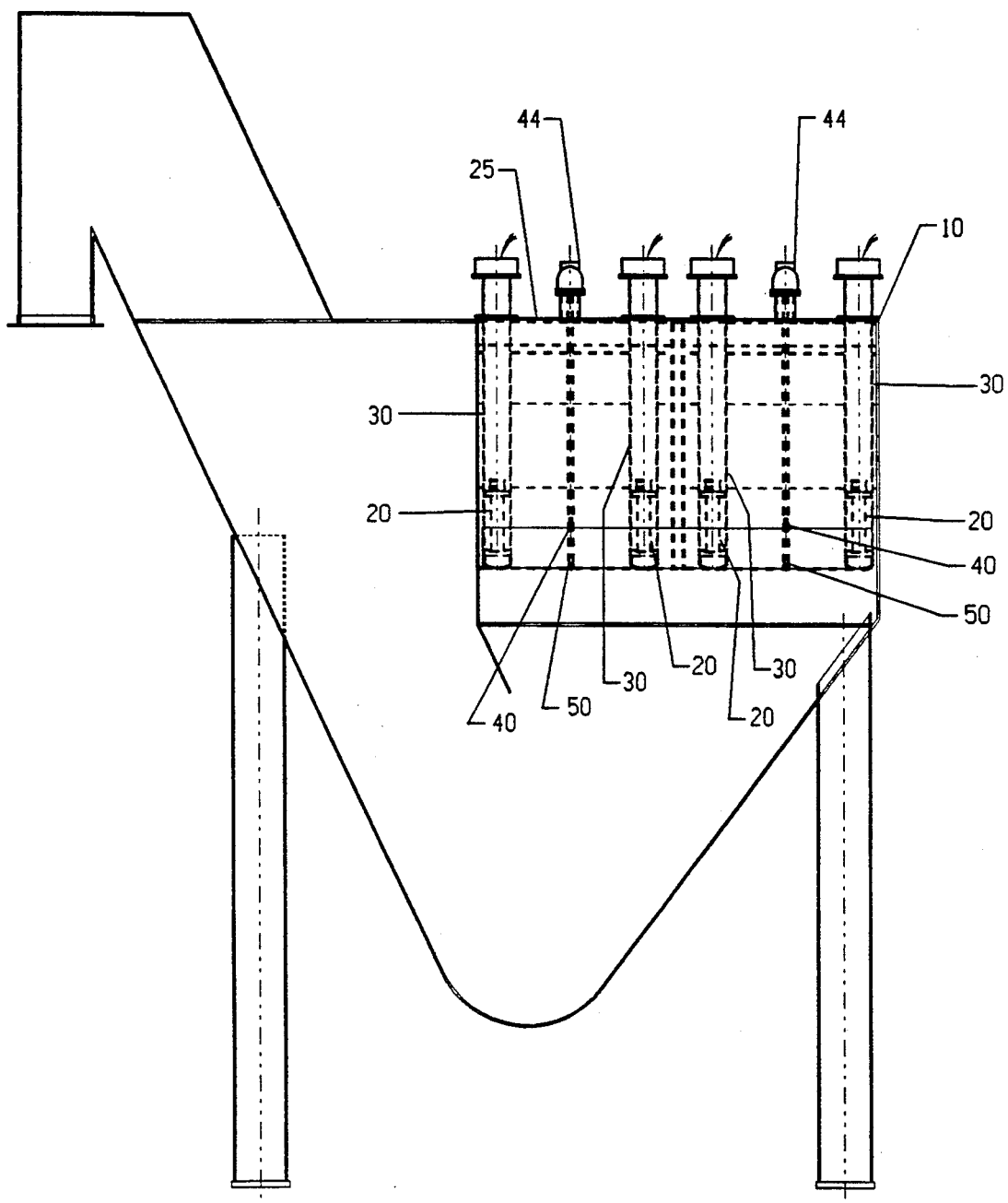
FIG. 6 illustrates a second modification for the source and detection units for the present invention.

FIG. 6 represents another embodiment of the detection unit of the present control system. In this embodiment two sources 40 are positioned at spaced relation to each other within the bed of the jig 10. Each of the sources 40 contained within the nuclear shielding 44 and the nuclear insertion tube 50 is provided with a pair of opposed scintillation detectors 20 positioned within detector housing 30. These units are all attached to mounting structure 25. The use of two spaced sources and two pair of opposed detectors minimizes the length of the zone of measurement further increasing the accuracy of the detected values which further increases the accuracy of the control of the refuse gate.

Figure 7:
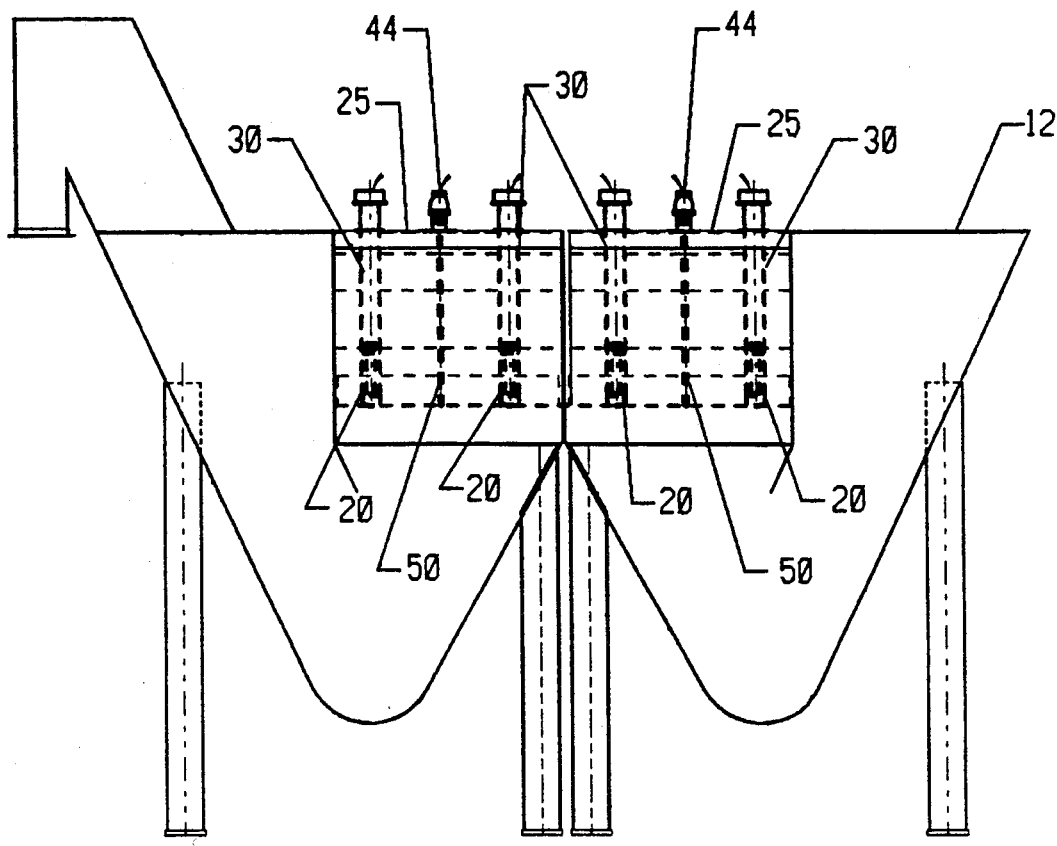
FIG. 7 illustrates a modified source and detector positioning adapted for a second common type of jig apparatus.

FIG. 7 illustrates a detector and source configuration for a control system of the present invention similar to FIG. 6 but adapted to be utilized in the bed of another commonly utilized jig 12.

Figure 8:
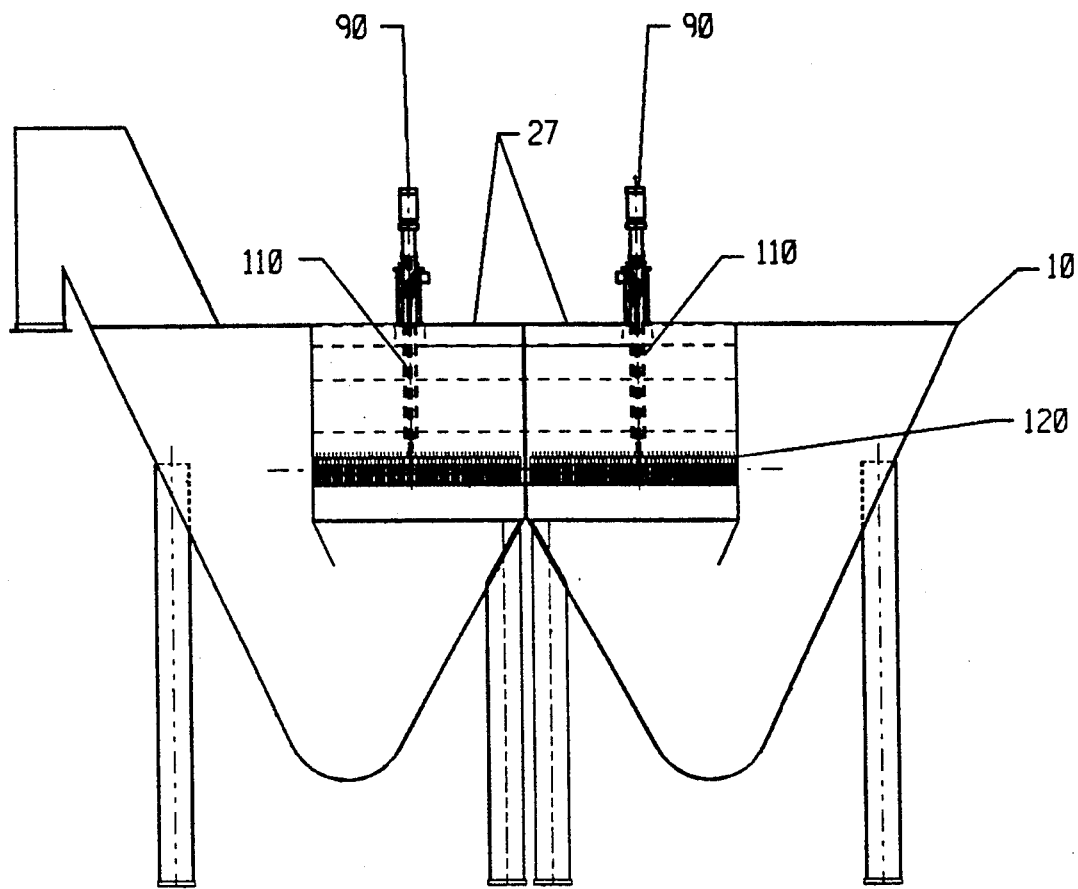
FIG. 8 illustrates a gate actuation device for the control unit disclosed in FIG. 7.

FIG. 8 represents the actuator unit configuration 90 for the source and detector configuration of FIG. 7. Two distinct actuators 90 are provided to operate the refuse gate 120. It should be noted that the actuators 90 may be independently operated.

Figure 9:
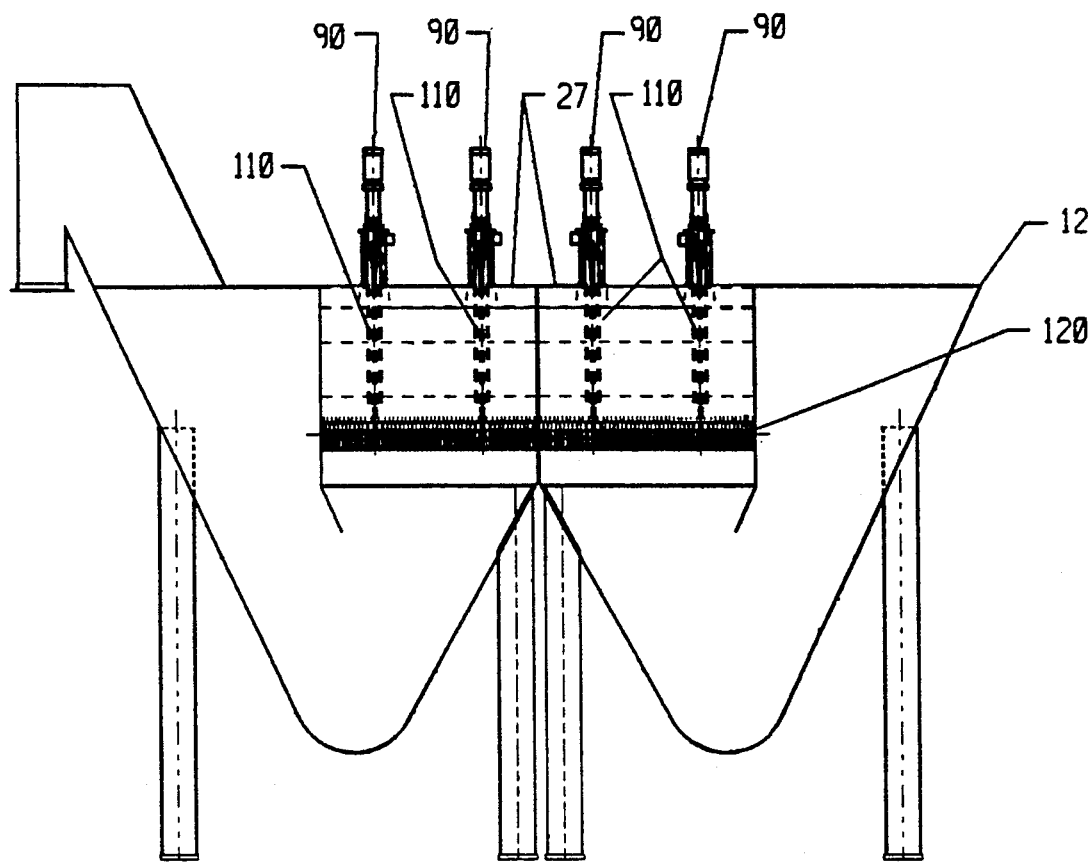
FIG. 9 illustrates a second modification for the refuse gate actuation units for the controller disclosed in FIG. 7.

FIG. 9 illustrates a further modification of the actuator unit for the control device disclosed in FIG. 7. In this embodiment two actuator units are provided on each side of the bed. All the actuators may be operated together in connection with the combined output of the detection units 20 or each side may be operated independently of the other according to the readings of the coupled detection units 20. The independent operation would allow for automatic compensation for variations in the stratification of the bed across the jig bed.

Figure 10A:
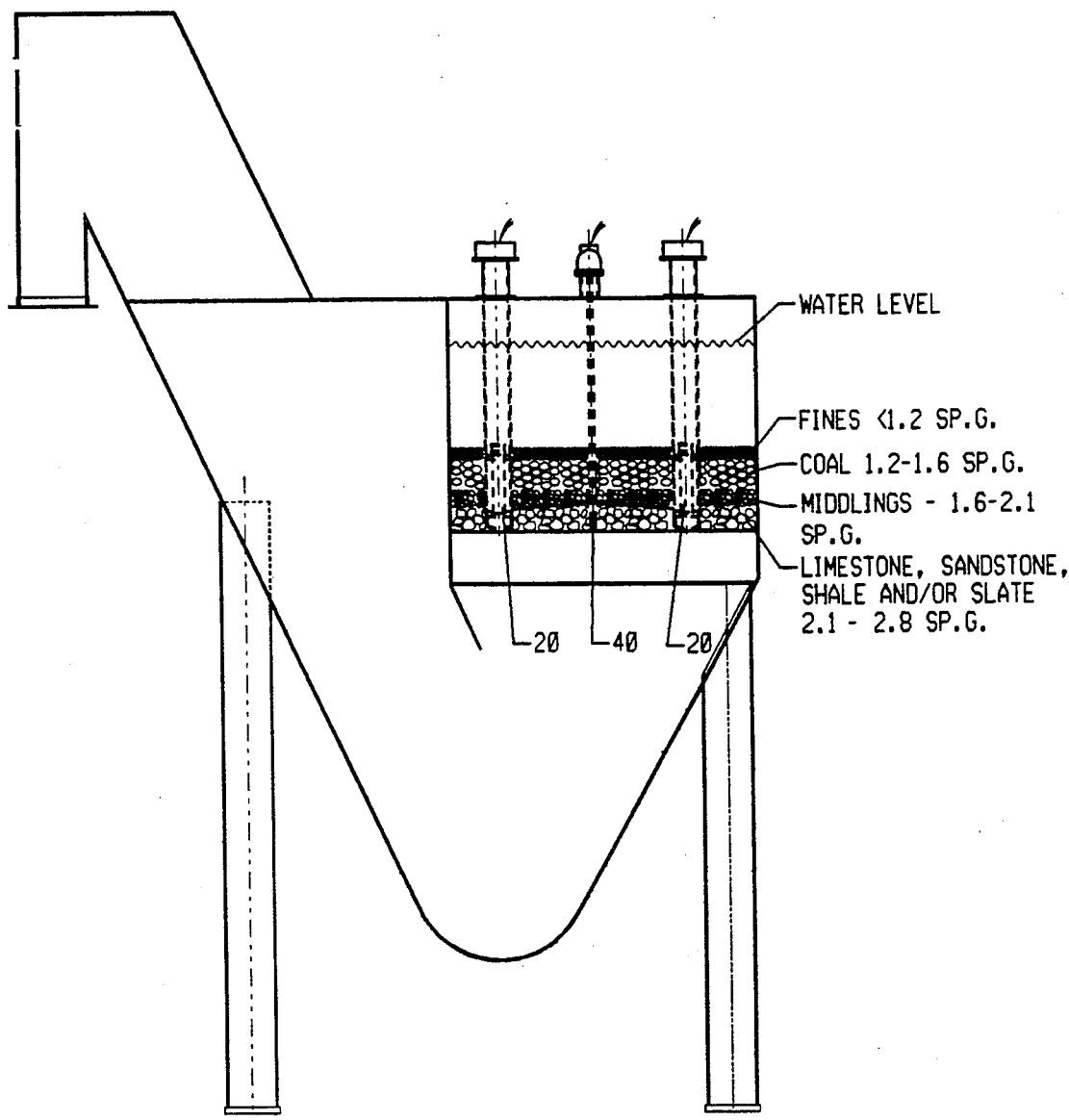
FIGS. 10A and 10B illustrate the positioning of the source and detector units relative to two different stratified beds of material.
Figure 10B:
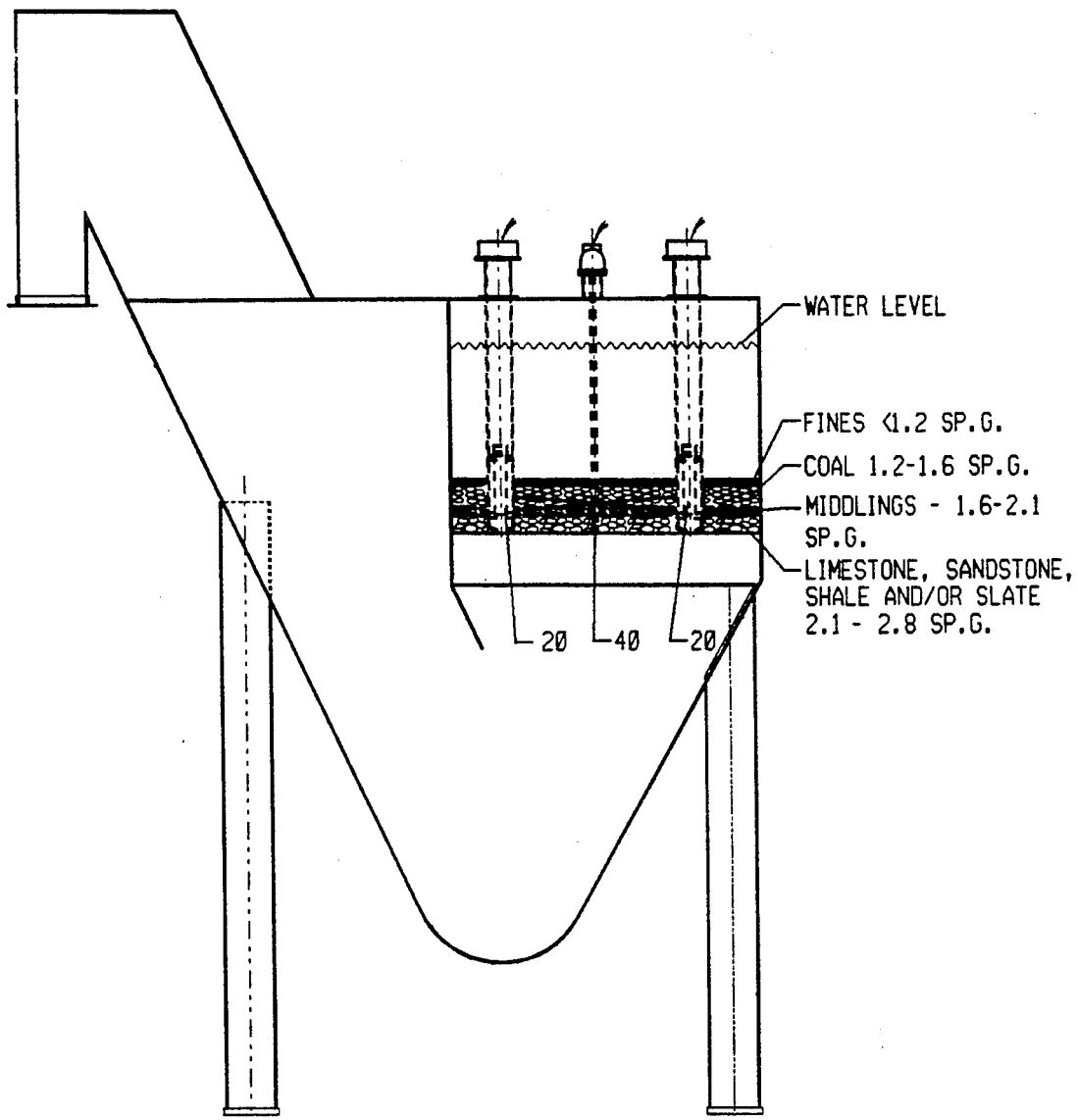

In use, the present device operates, for example, as follows. The control device is arranged such that the zone of measurement (extending between the source 40 and the detectors 20) is positioned at a location about 4" above the bottom of the jig 10 bed The zone of measurement extends substantially perpendicular to the flow of material of the bed and extends about 3" in the vertical direction of the bed. The vertical height of the zone of measurement is determined by the length of a measurement window in detector 20 and may be formed larger than 3". As seen in FIGS. 10A and 10B, the depth of the stratified bed is generally between 8–10". The low and high set points are set, for example at 1.40 and 2.0 specific gravity, respectively. When the detectors 20 detect a density outside of the appropriate range the proportional controller 80 will compensate accordingly by operation of the refuse gate 120. A reading of 1.50 specific gravity density within the 3" window of the detectors 20 would permit the refuse gate 120 to open slightly permitting a small amount of refuse to discharge, however, a density of 2.0 specific gravity would drive the refuse gate 120 to full open position, provided that the reading is within the 3" window on the detectors 20. Any time the specific gravity reading falls to 1.40, the refuse gate 120 closes. The minimum and maximum refuse gate movements may be established from sampling the refuse material to determine refuse sizing, i.e., if the average material size is 1.5" to 4", then the refuse gate height setting would be 1.5" at a reading of 1.5 specific gravity and 6" at a reading of 2.0 specific gravity.

The positioning and height of the vertical zone of measurement as well as the use of two detectors allows for a more accurate reflection of the true density of the respective layers by discounting the effects of minor fluctuation due to, for example, one or two large rocks.

The present system additionally allows for quick changes of the high and low set points as well as providing for proportional control of the refuse gate 120 giving greater flexibility to the device. The proportional control is provided by the use of the proportional control signal and proportional controller 80. This proportional control allows for opening or closing the refuse gate 120 to the extent needed to prevent usable or saleable material from entering the refuse chute. The proportional control allows for more efficient operation than merely having refuse gate 120 completely open or completely closed.

A better appreciation of the advantages of proportional control of the refuse gate is seen through a comparison of different stratified beds within the jig 12. FIGS. 10A and 10B show two distinct stratified beds within the jig 12. It can easily be seen that the stratified bed represented in FIG. 10B is far more compact than the stratified bed of FIG. 10A. Fully or completely opening the refuse gate 120 with the stratified bed represented in FIG. 10B would result in a potential loss of substantial amounts of usable or saleable coal product. The present apparatus can accommodate the stratified bed represented in FIG. 10B in one of two ways. First, the gate may respond proportionally to a reading between the high and low set points to only open slightly thereby retaining the usable/saleable coal product. Alternatively, if the stratified bed illustrated in FIG. 10B were representative of the entire bed, the maximum and minimum gate movement may be established to correspond to this specific stratification, i.e., the maximum gate opening would be set so as not to allow the usable or saleable coal to enter the refuse chute.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

We claim:

1. A control apparatus for controlling a refuse gate of a mineral washing jig, said control apparatus comprising:
   an insertion tube positioned within a bed of said jig wherein a radiation source is positioned within said tube;
   a pair of detectors positioned within said bed on opposite sides of said insertion tube for detecting an amount of radiation which passes through a vertically extending measuring zone between said detectors and said radiation source wherein said measuring zone is at least three inches in vertical height;
   an actuation unit for operatively opening and closing said refuse gate; and
   a control means for controlling the operation of said actuation unit comprising a means for averaging the output from said pair of detectors and a proportional controller means for generating a control signal from said averaged value, whereby, said generated control signal causes said actuation means to proportionally move the refuse gate to a position between a substantially closed and an open position as a function of the amount of average radiation detected by said pair of detectors.

2. The control apparatus of claim 1 wherein shielding means are provided for shielding said radiation source when said control apparatus is not is use.

3. The control apparatus of claim 1 wherein said insertion tube and said pair of detectors are attached to a frame member.

4. A method of controlling a refuse gate of a mineral washing jig, said method comprising the steps of:
   a) generating a specified amount of radiation at a selected location within the bed of said jig;
   b) simultaneously detecting at two locations on opposed sides of the radiation source the amount of said radiation which travels through a zone of measurement which extends substantially perpendicular to the flow of material and which extends vertically with respect to the bed of said jig;
   c) averaging said detected amounts of radiation to obtain an averaged radiation value;
   d) establishing high and low specific gravity set points based upon a specific gravity of the refuse material and a specific gravity of the mineral product;

e) generating a control signal proportional to said averaged radiation value relative to the established high and low specific gravity set points; and f) actuating said refuse gate in response to said generated control signal, whereby, said refuse gate is actuated to a closed position when the obtained average radiation value is at or below the low specific gravity set point and actuated to an open position when; the obtained average radiation value is at or above the high specific gravity set point and further actuated to a proportional position between the opened and closed positions when the obtained average radiation value is at a value between the high and low specific gravity set points.

5. The method of claim 4 wherein the source of said specified amount of radiation is cobalt 60.

6. The method of claim 4 wherein said zone of measurements extend from a source of radiation of two opposed detection units.

7. The method of claim 4, including the step of establishing a fully opened refuse gate position by sampling the refuse material to be processed and determining an average maximum refuse material size.

8. The method of claim 4 wherein the mineral being washed is coal.

9. The method of claim 8 wherein the upper and lower specific gravity set points are about 2.0 and about 1.4.

* * * * *

UNITED STATES PATENT AND TRADEMARK OFFICE
CERTIFICATE OF CORRECTION

PATENT NO. : 5,207,742
DATED : May 4, 1993
INVENTOR(S) : G. Edward Scutt and John J. Glista It is certified that error appears in the above-identified patent and that said Letters Patent is hereby corrected as shown below:

Title page, under References Cited, U.S. PATENT DOCUMENTS, "3,981,718 9/1976 Jedo" should read --3,981,799 9/1976 Jedo--.

Column 1 Line 65 after "jig" insert --.--.

Column 2 Line 30 "bear" should read --beam--.

Column 3 Line 3 after "material" insert --.--.

Column 4 Line 1 "begins" should read --begin--.

Column 4 Line 8 after "detected" insert --.--.

Column 7 Line 13 after "bed" insert --.--.

Signed and Sealed this

Fifteenth Day of February, 1994

*Attest:*

BRUCE LEHMAN

*Attesting Officer*      *Commissioner of Patents and Trademarks*